(12) United States Patent
Chalk et al.

(10) Patent No.: US 8,807,571 B2
(45) Date of Patent: Aug. 19, 2014

(54) WEAR-COMPENSATING SEALING RING ASSEMBLY

(71) Applicant: Air Products and Chemicals, Inc., Allentown, PA (US)

(72) Inventors: David Jonathan Chalk, Slatington, PA (US); Larry Thomas Stein, New Ringgold, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 13/630,525

(22) Filed: Sep. 28, 2012

(65) Prior Publication Data

US 2014/0090554 A1 Apr. 3, 2014

(51) Int. Cl.
*B24B 1/00* (2006.01)
(52) U.S. Cl.
USPC .............................. 277/494; 277/491; 277/490
(58) Field of Classification Search
USPC ......... 277/434, 435, 437, 441, 489, 490, 491, 277/494
See application file for complete search history.

(56) References Cited

U.S. PATENT DOCUMENTS

| 1,488,052 | A | * | 3/1924 | McFarlane | 277/446 |
| 1,538,107 | A | * | 5/1925 | Giller | 277/441 |
| 4,185,842 | A | | 1/1980 | Magara | |
| 6,322,080 | B1 | | 11/2001 | Feistel | |
| 6,899,595 | B2 | * | 5/2005 | Moriarty et al. | 451/36 |
| 2003/0006562 | A1 | | 1/2003 | Feistel | |

FOREIGN PATENT DOCUMENTS

DE 733653 C 3/1943
GB 2206669 A 1/1989

OTHER PUBLICATIONS

Feistel, Norbert, "Influence of piston ring design on the capacity of a dry-running hydrogen compressor", pp. 1-12.

* cited by examiner

*Primary Examiner* — Gilbert Lee
(74) *Attorney, Agent, or Firm* — Bryan C. Hoke, Jr.

(57) ABSTRACT

A seal assembly for a reciprocating piston system is provided that compensates for uneven wear rates between the ring components of the seal assembly by initially sizing a portion of the width of the sealing ring larger than the width of the annular recess in the cover ring, this portion at least partially overlapping the gap in the cover ring but not the gap in the sealing ring.

17 Claims, 8 Drawing Sheets

WEAR-COMPENSATING SEALING RING ASSEMBLY

FIELD OF THE INVENTION

A seal assembly for a reciprocating piston or shaft that compensates for uneven wear rates between the components of the seal assembly.

BACKGROUND OF THE INVENTION

Segmented assemblies for reciprocating compression and pump equipment are well-known in the art. Known segmented sealing ring assemblies often have multiple parts, for example a cover ring and a sealing ring, that will tend to wear at different rates over time due to the differences in pressure being exerted on the parts. In reciprocating piston systems, the rate of wear of the seal assembly rings is proportional to the contact stress the respective ring experiences when brought into contact with the sliding surface (for example the inside of the cylinder shaft). The higher the contact stress, the higher the consequent rate of wear. This contact stress is proportional to the pressure being sealed or, more accurately, the pressure differential across the seal assembly. The larger this pressure differential, the greater the contact stress acting on the seal assembly.

These pressure differentials cause the sealing ring to tend to wear more quickly than the cover ring due to the way that pressure acts on each of the rings over the life of the seal assembly. The tendency of the sealing ring to wear at a higher rate than the cover ring is referred to in the art as "preferential wear." Over time, preferential wear leads to a gap opening up between the sealing ring and the cover ring, as further discussed herein. This problem was recognized in a prior art technical publication entitled "Influence of piston ring design on the capacity of dry-running hydrogen compressor" (Dr. Norbert Feistel; Published by Burckhardt Compression AG of Winterthur, Switzerland). One such prior art device is disclosed in U.S. Pat. No. 4,185,842, which teaches a seal assembly comprising a sealing ring and a cover ring that is L-shaped in cross-section.

The gap in the cover ring would allow leakage similar to a butt joint ring, except the sealing ring covers this gap in the cover ring. Similarly, the gap in the sealing ring would allow leakage similar to a butt joint ring, except the cover ring covers this gap in the sealing ring. Initially, therefore, as a set of rings, the seal assembly is capable of sealing the entire circumference of the shaft or piston. The pressure differential acting on the seal assembly is relatively uniform when new, with the exception of the gap in the cover ring where the sealing ring is exposed and performs all of the sealing by itself. It is at this location that the preferential wear begins to occur. The sealing ring is exposed to the full pressure differential at this location, so the cover ring does none of the sealing at this location. Because the sealing ring has a high differential pressure across it at this location and the cover ring does not, the contact stress acting on the sealing ring is much higher than the contact stress acting on the cover ring. Therefore, the wear rate of the sealing ring is much higher than the wear rate of the cover ring. As the sealing ring begins to wear, a circumferential gap opens up between the cover ring and the sealing ring. This has the effect of increasing the radial location where the sealing ring alone is providing all of the sealing. As the radial length of this circumferential gap increases, the cover ring eventually no longer provides any sealing, the differential pressure across the cover ring and the contact stress acting on the cover ring declines, and the wear rate of the cover ring is reduced. The circumferential gap that has opened between the cover ring and the sealing ring continues to increase in size until it has circumnavigated the entire seal. The sealing ring thus becomes similar to a butt joint ring, allowing gas to flow through the gap in the sealing ring.

Other relevant prior art references include U.S. Patent Application Publication No. 2003/0006562 and U.S. Pat. No. 6,322,080. U.S. Patent Application Publication No. 2003/0006562 discloses a seal assembly which has a concentric tongue and groove arrangement which mechanically couples the two rings together to make up the seal assembly. With this arrangement, the two rings are coupled together so that wear on the sealing ring tends to produce a force on the cover ring in the direction of the pressure. In effect, the sealing ring 'pulls' the cover ring into the shaft or cylinder against which the sealing ring is running. By doing so, the cover ring presses against the moving shaft or cylinder, increasing its contact stress against the sliding surface and decreasing the contact stress of the sealing ring against the sliding surface. By coupling the two rings together in this manner, uneven ring wear can be minimized. However, the presence of the tongue and groove arrangement in this design produces shearing stress concentrations on the tongue portion of the sealing ring, and can result in failure of the seal assembly. U.S. Pat. No. 6,322,080 discloses a sealing ring having a radial wall thickness that decreases towards the area of the sealing ring gap. As opposed to the present invention, only the sealing ring of this device makes contact with the sliding surface (i.e, the moving shaft of the piston) and not the cover ring.

There is a need for a seal assembly design that compensates for the different wear rates of the cover ring and seal ring in a manner that does not introduce the other potential premature failure modes associated with the prior art.

BRIEF SUMMARY OF THE INVENTION

In one respect, the present invention addresses the shortcomings of the prior art devices by providing a seal assembly comprising a sealing ring having a sealing ring gap formed therein, an inner sealing ring wall, an outer sealing ring wall, wherein the outer sealing ring wall opposes the inner sealing ring wall, a top sealing ring wall and a bottom sealing ring wall wherein the bottom sealing ring wall opposes the top sealing ring wall, the top sealing ring wall having a radial sealing ring width, wherein one of the inner sealing ring wall and the outer sealing ring wall is a sealing wall; and a cover ring having a cover ring gap formed therein, an inner cover ring wall, an outer cover ring wall, wherein the outer cover ring wall opposes the inner cover ring wall, a top cover ring wall, and a bottom cover ring wall wherein the bottom cover ring wall opposes the top cover ring wall, an annular recess having a floor that opposes the bottom cover ring wall and a recess wall that opposes one of the inner cover ring wall and the outer cover ring wall, the floor having a radial recess width and a sealing edge that is distal to the recess wall; wherein the sealing ring and the cover ring have an assembled position in which the sealing ring is seated in the annular recess of the cover ring, the sealing ring gap does not overlap the cover ring gap, wherein the sealing ring and the cover ring form a first region and a second region when in the assembled position, wherein the first region overlaps the sealing ring gap and not the cover ring gap and the second region overlaps the cover ring gap and not the sealing ring gap, and wherein the radial recess width is less than the radial sealing ring width in the second region.

In another respect, the present invention addresses the shortcomings of the prior art devices by providing an apparatus comprising a cylinder; and a piston that is located within the cylinder and that is operatively configured to reciprocate within the cylinder, the piston having at least one seal assembly, each of the at least one seal assembly being seated in an annular groove and comprising the seal assembly recited in the preceding paragraph.

In yet another respect, the present invention addresses the shortcomings of the prior art devices by providing an apparatus comprising a cylinder having at least one seal assembly, each of the at least one seal assembly being seated in an annular groove and comprising the seal assembly recited two paragraphs above; and a shaft that is located within the cylinder and that is operatively configured to reciprocate within the cylinder.

The present disclosure provides additional aspects of the invention, as detailed below.

Aspect 1. A seal assembly comprising:

a sealing ring having a sealing ring gap formed therein, an inner sealing ring wall, an outer sealing ring wall, wherein the outer sealing ring wall opposes the inner sealing ring wall, a top sealing ring wall and a bottom sealing ring wall wherein the bottom sealing ring wall opposes the top sealing ring wall, the top sealing ring wall having a radial sealing ring width, wherein one of the inner sealing ring wall and the outer sealing ring wall is a sealing wall; and a cover ring having a cover ring gap formed therein, an inner cover ring wall, an outer cover ring wall, wherein the outer cover ring wall opposes the inner cover ring wall, a top cover ring wall, and a bottom cover ring wall wherein the bottom cover ring wall opposes the top cover ring wall, an annular recess having a floor that opposes the bottom cover ring wall and a recess wall that opposes one of the inner cover ring wall and the outer cover ring wall, the floor having a radial recess width and a sealing edge that is distal to the recess wall;

wherein the sealing ring and the cover ring have an assembled position in which the sealing ring is seated in the annular recess of the cover ring, the sealing ring gap does not overlap the cover ring gap, wherein the sealing ring and the cover ring form a first region and a second region when in the assembled position, wherein the first region overlaps the sealing ring gap and not the cover ring gap and the second region overlaps the cover ring gap and not the sealing ring gap, and wherein the radial recess width is less than the radial sealing ring width in the second region.

Aspect 2. The seal assembly of any of Aspects 1 and 3-10, wherein the first region extends a radial angle of at least 15 degrees in a clockwise and counterclockwise direction from a midpoint of the sealing ring gap.

Aspect 3. The seal assembly of any of Aspects 1, 2, and 4-10, wherein the sealing wall protrudes beyond the sealing edge of the floor of the annular recess in the second region.

Aspect 4. The seal assembly of any of Aspects 1-3 and 5-10, wherein the radial recess width is no greater than the radial sealing ring width in the first region.

Aspect 5. The seal assembly of any of Aspects 1-4 and 6-10, wherein an arcuate length of a portion of the cover ring located within first region is at least 5 times a radial width of the seal assembly.

Aspect 6. The seal assembly of any of Aspects 1-5 and 7-10, wherein an arcuate length of a portion of the cover ring located within first region is between 8 and 10 times a radial width of the seal assembly.

Aspect 7. The seal assembly of any of Aspects 1-6 and 8-10, wherein the radial sealing ring width is constant throughout the first region and the second region.

Aspect 8. The seal assembly of any of Aspects 1-7, 9, and 10, wherein the annular recess has a rectangular cross section.

Aspect 9. The seal assembly of any of Aspects 1-8 and 10, wherein the sealing ring has a rectangular cross section.

Aspect 10. The seal assembly of any of Aspects 1-9, further comprising means for preventing rotation of the sealing ring relative to the cover ring when the sealing ring and the cover ring are in the assembled position.

Aspect 11. An apparatus comprising:

a cylinder; and a piston that is located within the cylinder and is operatively configured to reciprocate within the cylinder, the piston having at least one seal assembly, each of the at least one seal assembly being seated in an annular groove and comprising the seal assembly recited in any of Aspects 1-10.

Aspect 12. An apparatus comprising:

a cylinder having at least one seal assembly, each of the at least one seal assembly being seated in an annular groove and comprising the seal assembly recited in any of Aspects 1-10; and a shaft that is located within the cylinder and is operatively configured to reciprocate within the cylinder.

DETAILED DESCRIPTION OF THE INVENTION

Figure 1A:
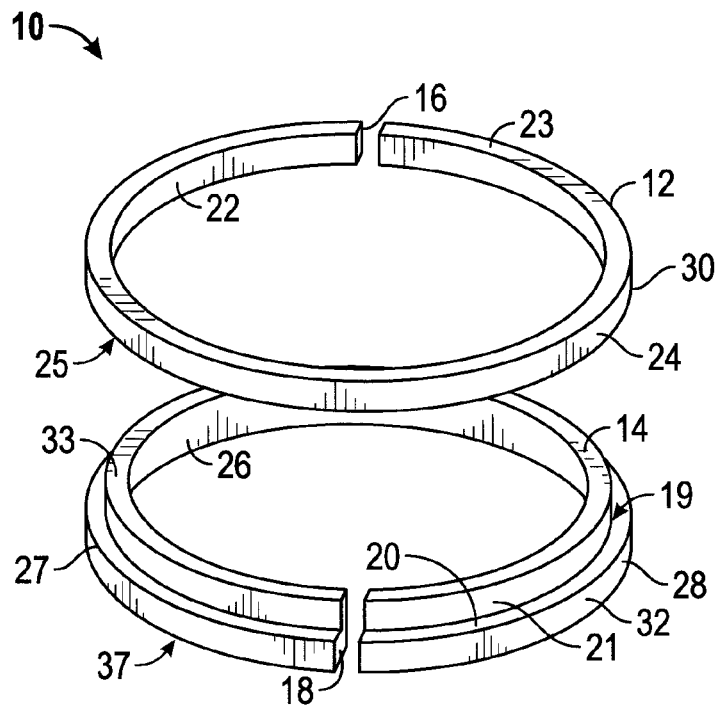
FIG. 1A is an exploded view of a first prior art seal assembly, intended to seal inside a cylinder.

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention. It should be understood that various changes may be made in the function and arrangement of elements without departing from the spirit and scope of the invention.

In order to aid in describing the invention, directional terms may be used in the specification and claims to describe portions of the present invention (e.g., upper, lower, left, right, etc.). These directional terms are merely intended to assist in describing and claiming the invention and are not intended to limit the invention in any way. In addition, reference numerals that are introduced in the specification in association with a drawing figure may be repeated in one or more subsequent figures without additional description in the specification in order to provide context for other features.

As used herein, the terms "radial" or "radially" refer to a measurement made along a radius.

As discussed in greater detail above, the primary problem addressed by this invention is the inability of known segmented sealing ring assemblies to maintain a consistent seal over time as the components of the seal assembly wear.

FIGS. 1A-2B show a first example of a seal assembly 10 according to the prior art, and FIGS. 3A-4B show a second example of a seal assembly 110 according to the prior art. In the embodiment shown in FIGS. 3A-4B, features shared with the first embodiment are represented by reference numerals increased by 100. For example, the sealing ring 12 of the embodiment of FIGS. 1A-2B corresponds with the sealing ring 112 of the embodiment of FIGS. 3A-4B. In the interest of brevity, some features of the second embodiment that are shared with the first embodiment are numbered in FIGS. 3A-4B, but are not repeated in the specification. The seal assemblies 10, 110 of the prior art are included in the detailed description of the invention because they share features with exemplary embodiments of the invention provided herein, and therefore provide an enhanced understanding of the present invention.

Figure 1B:
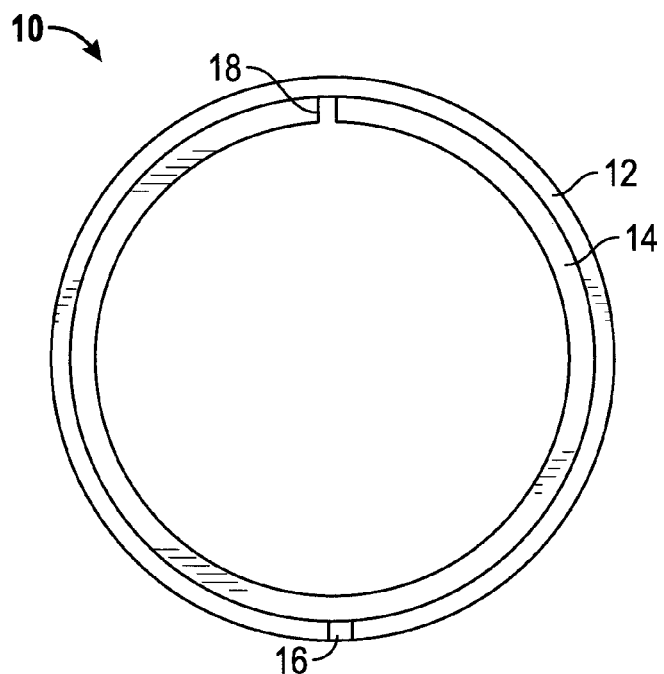
FIG. 1B is a bottom view, a view from the low pressure side, of the prior art seal assembly of FIG. 1A in an assembled configuration.

FIG. 1A shows an exploded view of the seal assembly 10. The seal assembly 10 includes a sealing ring 12 and a cover ring 14. As seen in FIG. 1B, the cover ring 14 has an annular recess 19 formed therein in which the sealing ring 12 sits when the seal assembly 10 is assembled. In this example, the annular recess 19 has a rectangular cross section, including a recess floor 20 that intersects a recess wall 21 at a right angle. The sealing ring 12 has a sealing ring gap 16 located therein, and cover ring 14 has a cover ring gap 18 located therein. In this embodiment, as best seen in FIG. 1B, these gaps 16, 18 are arranged exactly opposite each other, i.e., arranged 180 degrees from each other. This opposing arrangement of the gaps 16, 18 may be maintained by providing at least one protrusion (not shown) on one of the sealing ring 12 or cover ring 14, and a complementary-shaped at least one receptacle (not shown) on the other of the sealing ring 12 or cover ring 14. When the seal assembly 10 is installed around a piston 34 and into a cylinder 36 (see FIG. 2A), the gaps 16, 18 are slightly compressed. An autogenous spring force is thus created within the rings 12, 14, which causes the rings 12, 14 to press outwardly against the inside surface of the cylinder 36, thereby helping to improve the quality of the seal therebetween.

The sealing ring 12 has an inner sealing ring wall 22, an outer sealing ring wall 24, a bottom sealing ring wall 23, and a top sealing ring wall 25. The sealing ring 12 is rectangular in cross-section. When the sealing ring 12 is placed into the annular recess 19, the top sealing ring wall 25 of the sealing ring 12 rests against the recess floor 20 of the cover ring 14 and creates a sealing edge 27 at the outer periphery of where the sealing ring 12 and cover ring 14 meet. The cover ring 14 has an inner cover ring wall 26, an outer cover ring wall 28, a bottom cover ring wall 33, and a top cover ring wall 37. In this embodiment, the outer sealing ring wall 24 forms a sealing wall 30 and the outer cover ring wall 28 forms a sealing wall 32.

Figure 2A:
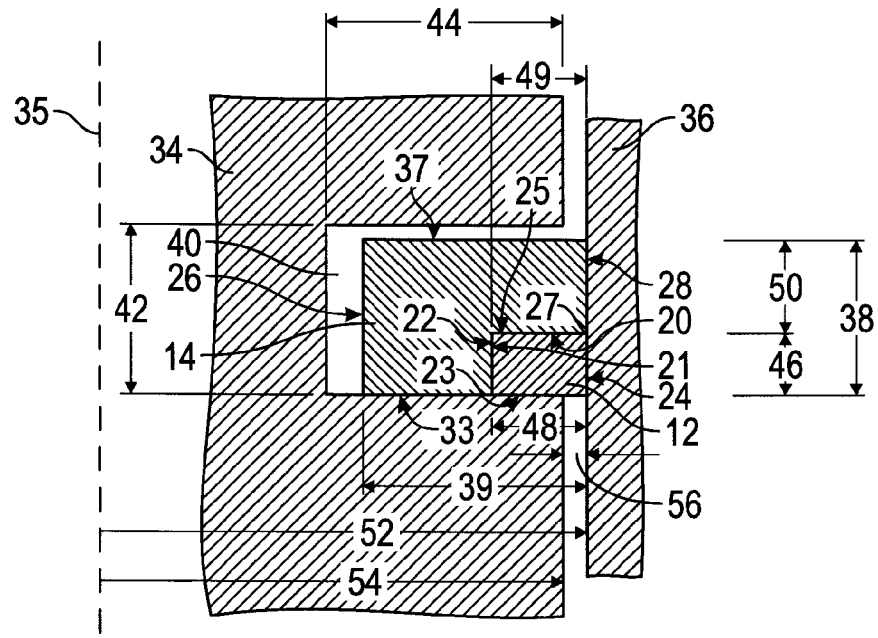
FIG. 2A is a partial cross-sectional view of the prior art seal assembly of FIG. 1A installed in a typical reciprocating piston system, prior to wearing of the components of the seal assembly.

FIG. 2A is a partial cross-sectional view of the seal assembly 10 installed in a typical reciprocating piston system, showing the seal assembly 10 with little or no wear. The seal assembly 10 is shown installed into an annular recess 40 formed in a piston 34, and surrounded by a cylinder 36 in which the piston 34 reciprocates. The annular recess 40 in the piston 34 has a height 42 and a width 44. The seal assembly 10 has a height 38 and a radial width 39. The sealing ring 12 has a height 46 and a radial width 48, and the annular recess 19 of the cover ring 14 has a height 46 and a radial width 49. The difference between the height 38 of the entire seal assembly 10 and the height 46 of the sealing ring 12 is indicated by reference numeral 50, which in this embodiment corresponds to the height of the outer cover ring wall 28. An outer diameter 54 of the piston 34 is measured between a shared centerline 35 of the piston 34 and cylinder 36, and an inner diameter 52 of the cylinder 36 is measured from this centerline 35. The difference between these two diameters 52, 54 is equal to the size of the gap 56 between the piston 34 and the cylinder 36. In this example, the sealing walls 30, 32 seal the gap between the piston 34 and the cylinder 36.

Figure 2B:
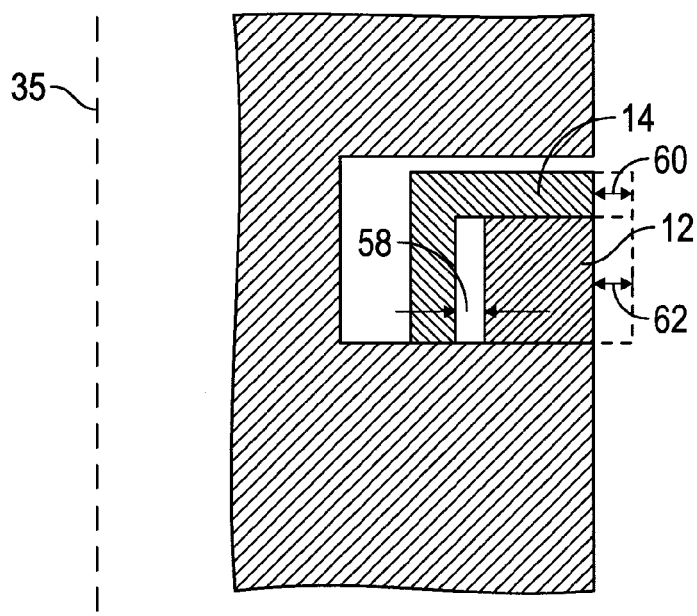
FIG. 2B is a partial cross-sectional view thereof, after wearing of the components of the seal assembly.

Prior to any wearing of the seal assembly 10 occurring, the radial width 39 of the seal assembly 10 is uniform because the radial width of the annular recess 19 of the cover ring 14 is equal to the radial width 48 of the sealing ring 12 along the entire perimeter of the seal assembly 10 (with the exception of the locations of the gaps 16, 18). As discussed above, as the seal assembly 10 starts to wear, the outer sealing ring wall 24 will wear at a higher rate than will the outer cover ring wall 28. In other words, the radial width 48 of the sealing ring 12 will begin to decrease in size more rapidly than the radial width 49 of the annular recess 19 of the cover ring 14. Consequently, as shown in FIG. 2B, a gap 58 will begin to open between the recess wall 21 of the annular recess 19 and the inner sealing ring wall 22. In FIG. 2B, the width of the worn portion 60 of the cover ring 14 and the width of the worn portion 62 of the sealing ring 12 are shown. In actuality, reference numerals 60, 62 do not accurately represent the full widths of the worn portions of the sealing ring 12 or cover ring 14, since the position of the rings 12, 14 within the annular recess 40 will change over time due to the autogenous spring force generated by the gaps 16, 18 in the rings 12, 14. As discussed above, in this embodiment, the circumferential gap 58 between the cover ring 14 and the sealing ring 12 will continue to increase in size until it has circumnavigated the entire seal assembly 10. The seal assembly 10 will then begin to fail because gas is free to flow through the gap 58.

Figure 3A:
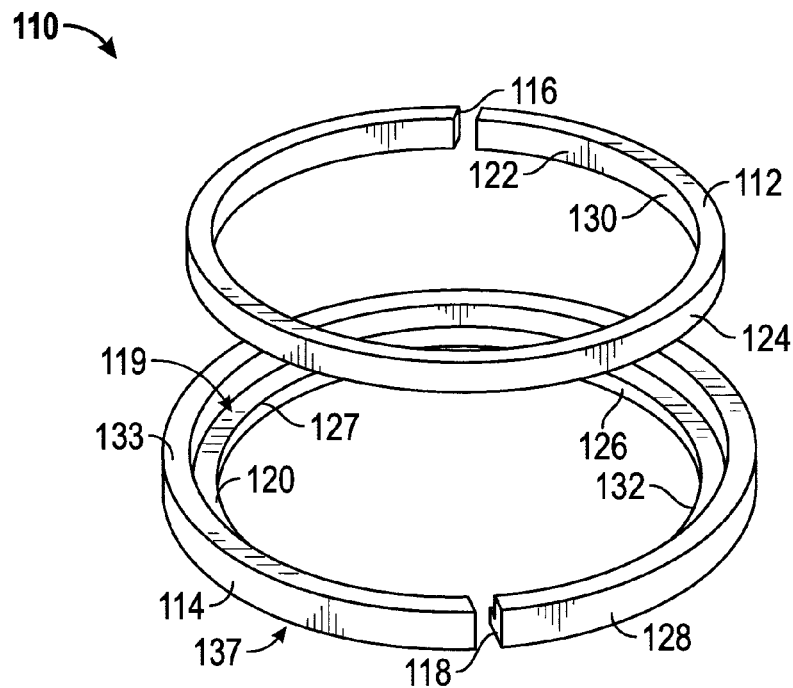
FIG. 3A is an exploded view of a second prior art seal assembly, intended to seal on a shaft.
Figure 3B:
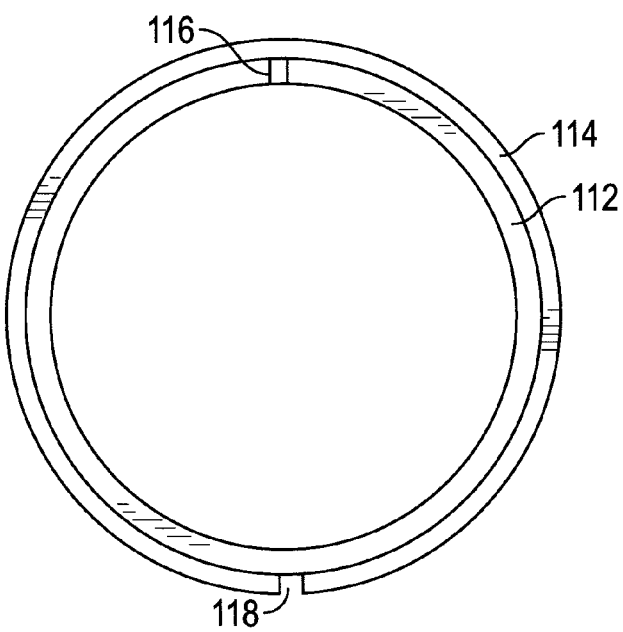
FIG. 3B is a bottom view of the prior art seal assembly of FIG. 3A in an assembled configuration.

FIG. 3A shows an exploded view of the seal assembly 110 according to the prior art. In this embodiment, the annular recess 140 in which the seal assembly 110 is seated is located in the cylinder 136, instead of in the piston 134. The annular recess 119 in the cover ring 114 is located on the interior side thereof (La, adjacent to the inner cover ring wall 126). Thus, in this embodiment, the sealing wall 130 of the sealing ring 112 corresponds with the inner sealing ring wall 122 and the sealing wall 132 of the cover ring 114 corresponds with the inner cover ring wall 126. Otherwise, the embodiment of the seal assembly 110 according to the prior art is functionally equivalent to the embodiment of the seal assembly 10 of FIGS. 1A-2B, and a person having ordinary skill in the art will appreciate that the seal assembly 110 is prone to similar wearing issues as the seal assembly 10.

Figure 4A:
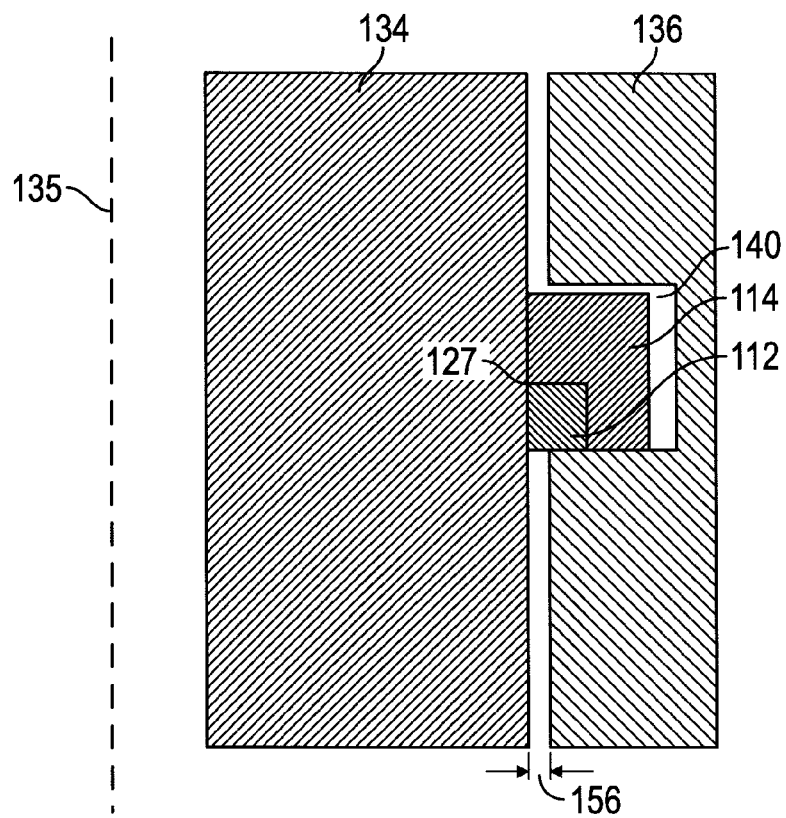
FIG. 4A is a partial cross-sectional view of the prior art seal assembly of FIG. 3A installed in a typical reciprocating piston system, prior to wearing of the components of the seal assembly.
Figure 4B:
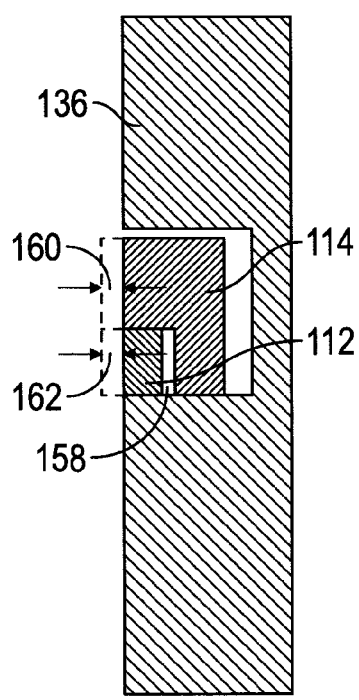
FIG. 4B is a partial cross-sectional view thereof, after wearing of the components of the seal assembly.
Figure 5A:
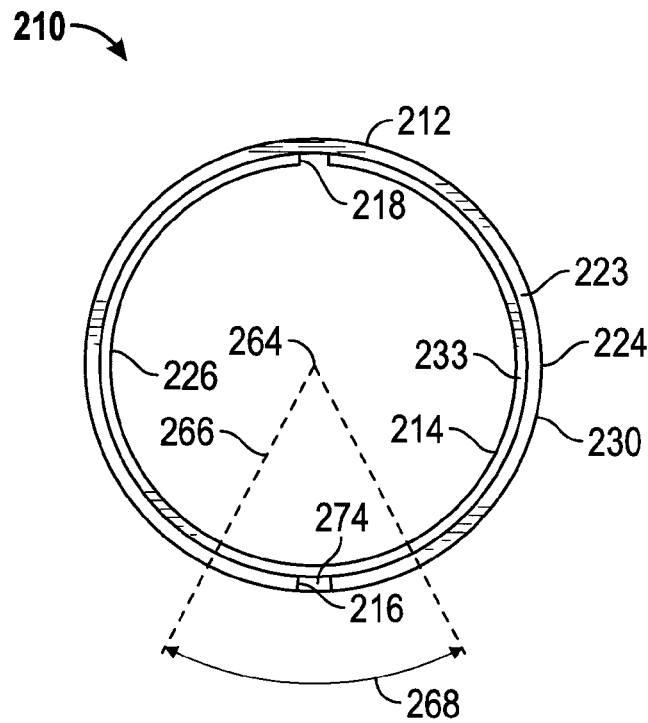
FIG. 5A is a bottom view, a view from the low pressure side, of a first embodiment of a seal assembly according to the present invention.
Figure 5B:
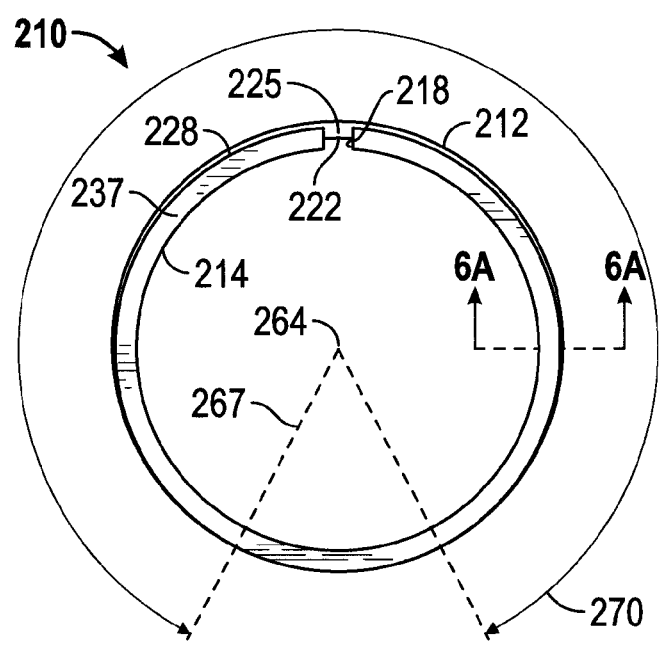
FIG. 5B is a top view thereof.

In the interest of simplifying the description and drawings, only one seal assembly 10 is shown in FIGS. 2A-2B and only one seal assembly 110 is shown in FIGS. 4A-4B. It should be noted that it is common to provide multiple seal assemblies 10 on a single piston 34 in a reciprocating piston application or multiple seal assemblies 110 on a single shaft 136 in a reciprocating shaft application.

FIGS. 5A-6B show a first embodiment of a seal assembly 210 according to the present invention. In the embodiment shown in FIGS. 5A-6B, elements shared with the embodiments of the seal assembly 10 are represented by reference numerals increased by 200. For example, the sealing ring 212 of the embodiment of FIGS. 5A-6B corresponds with the sealing ring 12 of the embodiment of FIGS. 1A-2B. In the interest of brevity, some features of the second embodiment that are shared with the first embodiment are numbered in FIGS. 5A-6B, but are not repeated in the specification.

Figure 6A:
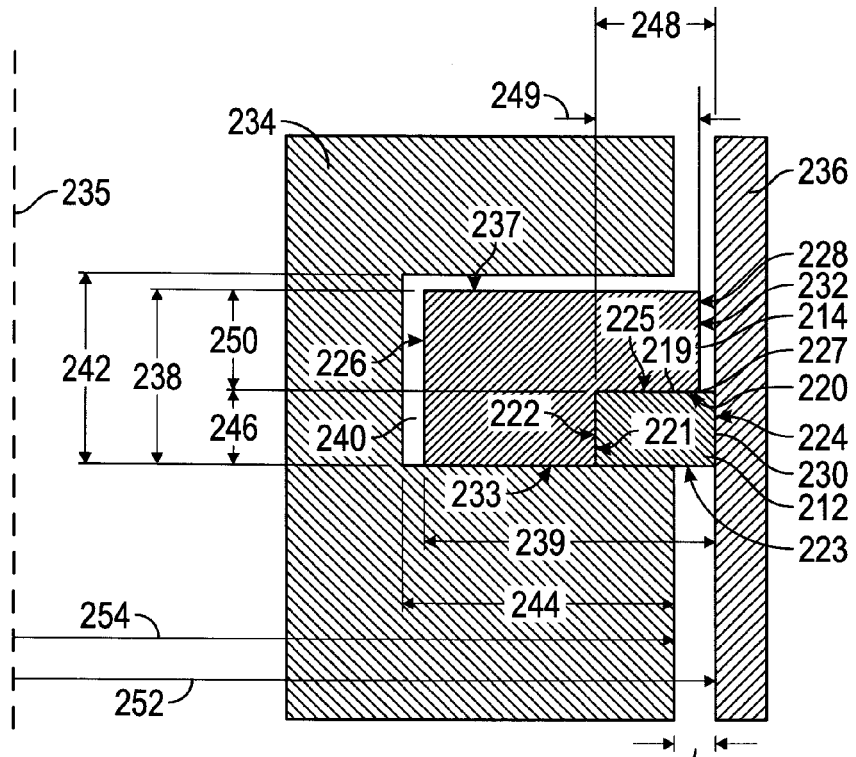
FIG. 6A is a partial cross-sectional view taken along line 6A-6A of FIG. 5B installed in a typical reciprocating piston system, prior to wearing of the components of the seal assembly.

Referring to FIG. 6A, the sealing ring 212 is manufactured to have a first region 268 in which a radial recess width 249 of annular recess 219 is equal to a radial width 248 of the sealing ring 212 and a second region 270 in which the radial recess width 249 of annular recess 219 is less than the radial width 248 of the sealing ring 212. This results in the sealing wall 230 of the sealing ring 212 protruding beyond the outer cover ring wall 228 in the second region 270, but not in the first region 268.

In this exemplary embodiment, the radial recess width 249 of annular recess 219 is decreased in the second region 270 in order to make it less than the radial width 248 of the sealing ring 212. Accordingly, the radial width 248 of the sealing ring 212 remains constant throughout its entire circumference. Alternatively, it would be possible to increase the radial width 248 of the sealing ring 212 in the second region and keep the radial recess width 249 of annular recess 219 constant throughout its circumference.

In this embodiment, the outer sealing ring wall 224 is the sealing wall 230. Accordingly, the difference in radial widths of the annular recess 219 and the sealing ring 212 cause the outer sealing ring wall 224 to protrude outwardly beyond the outer cover ring wall 228. In an embodiment in which the inner sealing ring wall 222 is the sealing wall (like the sealing assembly 110), the difference in radial widths of the annular recess 219 and the sealing ring 212 would cause the inner sealing ring wall 222 to protrude inwardly beyond the inner cover ring wall 226.

The first region 268 overlaps the location of the sealing ring gap 216. Accordingly, the sealing wall 232 of the cover ring 214 is in contact with the cylinder 236 in the region in which presence of the sealing ring gap 216 would allow air to flow past the seal assembly 210 if the radial recess width 249 of annular recess 219 was less than the radial width 248 of the sealing ring 212. As discussed in greater detail herein, the first region 268 preferably extends beyond the location of the sealing ring gap 216.

Figure 6B:
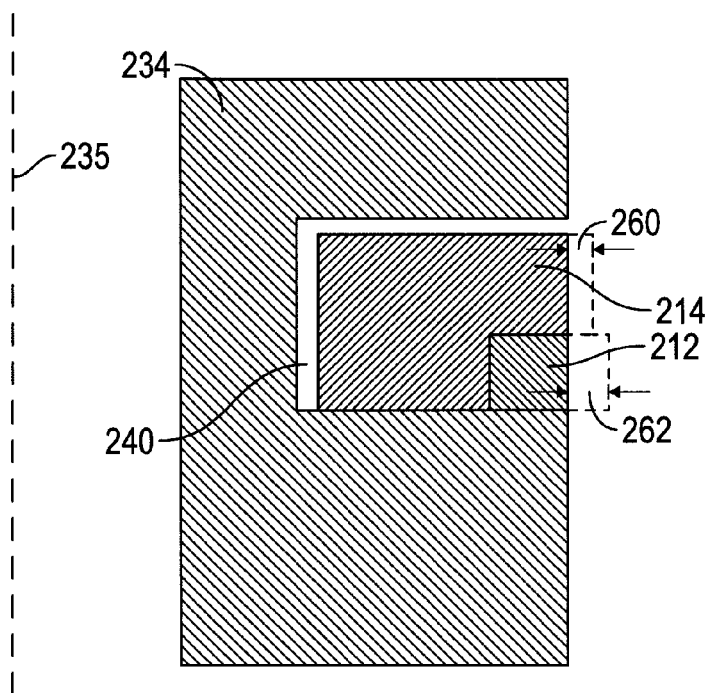
FIG. 6B is a partial cross-sectional view thereof, after wearing of the components of the seal assembly.

Referring to FIG. 6B, as the seal assembly 210 begins to wear, the initial "over-sizing" of the radial width 248 of the sealing ring 212 in the second region 270 compensates for the differential wear rates of the rings 212, 214 and avoids the formation of a gap between the recess wall 221 of the annular recess 219 and the inner sealing ring wall 222. Preferential wear of the sealing ring 212 gradually results in a reduction in the difference between the radial recess width 249 of annular recess 219 and the radial width 248 of the sealing ring 212 in the second region 270. Eventually, as shown in FIG. 6B, the radial recess width 249 of annular recess 219 will become equal to the radial width 248 of the sealing ring 212.

The pressure of the fluid to be sealed is used to force the cover ring 214 against the sealing ring 212, so that no gap opens between the two rings 212, 214. If any gap were to begin to open between the rings 212, 214, the contact force acting on the sealing ring 212 would begin to decrease and the contact force acting on the cover ring 214 would begin to increase, which would tend to reduce the size of the gap. Therefore, the design of the seal assembly 210 enables the seal assembly 210 to undergo more wear before a gap will form between the sealing ring 212 and the cover ring 214. This permits the seal assembly 210 to have a longer operational life than the seal assemblies 10, 110.

Referring again to FIGS. 5A and 5B, which show respectively bottom and top views of the seal assembly 210, it can be seen in this embodiment that the radial width 248 of the sealing ring 212 is sized greater than the radial recess width 249 of the annular recess 219 around approximately 85% of the circumference of the seal assembly 210, this portion being centered about the cover ring gap 218. The portion of the circumference of the seal assembly 210 in which the radial width 248 of the sealing ring 212 is initially sized greater than the radial recess width 249 of the annular recess 219 defines the second region 270. The perimeter of a sector 267 of a circle may be defined by the second region 270 and two lines radiating from a center-point 264 of the circumference of the seal assembly 210 to the points on the circumference of the seal assembly 210 where the radial width 248 and radial recess width 249 become equal.

The portion of the circumference of the seal assembly 210 in which the radial width 248 of the sealing ring 212 is initially sized equal to the radial recess width 249 of the annular recess 219 defines the first region 268. In this embodiment, the first region 268 is preferably centered about a midpoint 274 of the sealing ring gap 216 and extends a radial angle of about 30 degrees in clockwise and counter-clockwise directions from the midpoint 274.

As noted above, the first region 268 preferably extends at least around that portion of the circumference of the seal assembly 210 corresponding with the width of the sealing ring gap 216. The perimeter of a sector 266 of a circle may be defined by the first region 268 and two lines radiating from the center-point 264 to the edges of the sealing ring gap 216. In this embodiment, the combined length of the first region 268 and the second region 270 comprise the entire circumference of the seal assembly 210.

The arcuate length of the portion of the cover ring 214 that falls within the second region 270 is preferably at least five (5) times the radial width 239 of the seal assembly 210. More preferably, the second region 270 is in the range of 8-10 times the radial width 239 of the seal assembly 210.

Figure 7A:
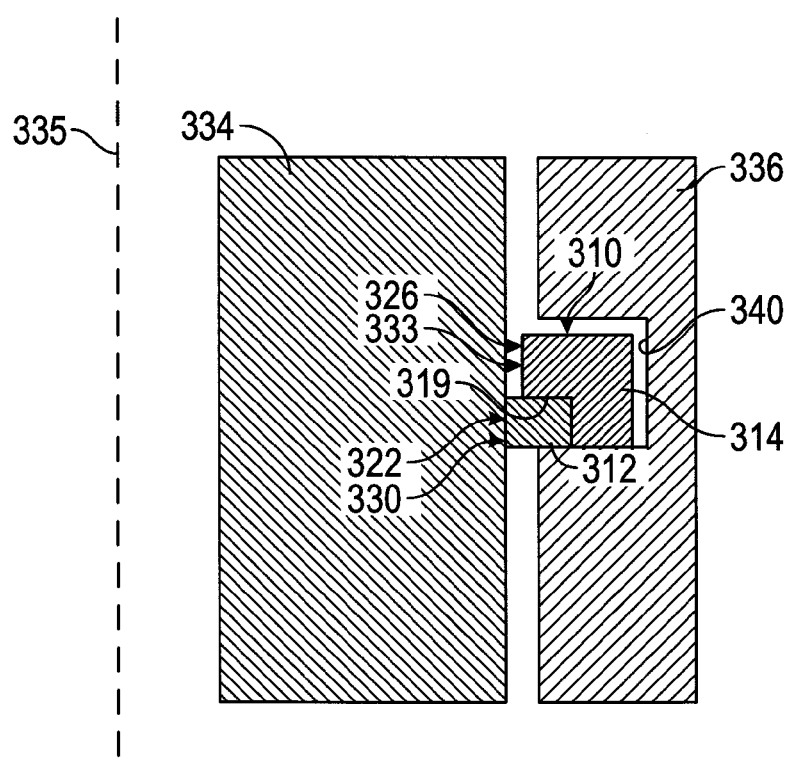
FIG. 7A is a partial cross-sectional view of a second embodiment of a seal assembly according to the present invention, prior to wearing of the components of the seal assembly.
Figure 7B:
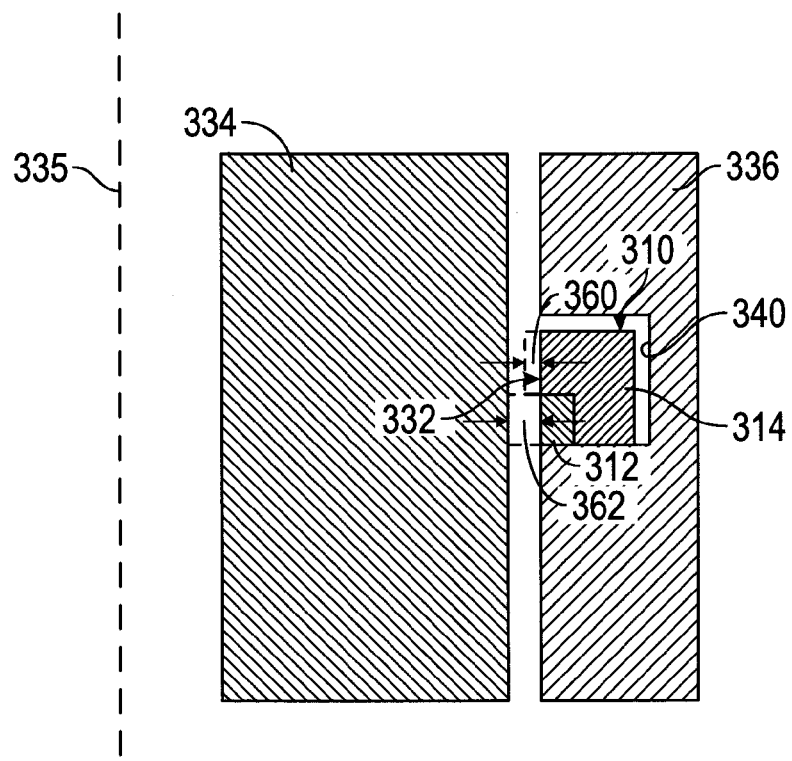
FIG. 7B is a partial cross-sectional view thereof, after wearing of the components of the seal assembly.

FIGS. 7A and 7B show a second embodiment of a seal assembly 310 according to the present invention. In the embodiment shown in FIGS. 7A and 7B, elements shared with the embodiments of the seal assemblies 110, 210 are represented by reference numerals increased by 100 and 200, respectively. In the interest of brevity, some features of the second embodiment that are shared with the first embodiment are numbered in FIGS. 7A and 7B, but are not repeated in the specification. In addition, many of the dimensional elements described with respect to the first embodiment of the seal assembly 210, such as the radial width 239, are not shown in FIG. 7A or 7B or described with respect to the second embodiment of the seal assembly 310 but should be understood as being present in second embodiment of the seal assembly 310.

FIG. 7A shows a partial cross-sectional view of a second embodiment of a seal assembly 310, which seals a shaft 334 that is intended to reciprocate within a cylinder 336. In this embodiment, the annular recess 340, in which the seal assembly 310 is seated, is located in the cylinder 336. The annular recess 319 in the cover ring 314 is located on the interior side thereof (i.e., adjacent to the inner cover ring wall 326). Thus, in this embodiment, the sealing wall 330 of the sealing ring 312 corresponds with the inner sealing ring wall 322 and the sealing wall 332 of the cover ring 314 corresponds with the inner cover ring wall 326. Otherwise, this second embodiment of the seal assembly 310 is functionally equivalent to the first embodiment of the seal assembly 210 of FIGS. 5A-6B, as would be appreciated by a person having ordinary skill in the art.

Figure 8:
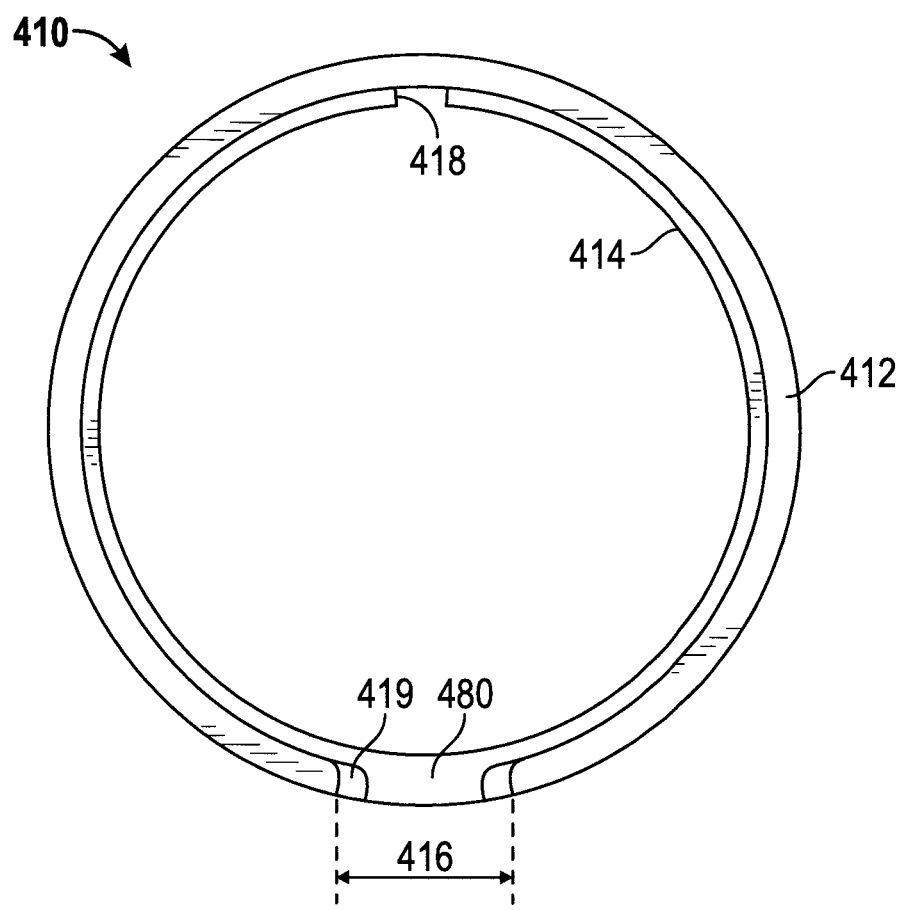
FIG. 8 is a bottom view of a third embodiment of a seal assembly according to the present invention.

FIG. 8 shows a bottom view of a third embodiment of a seal assembly 410 according to the present invention. The seal assembly includes a sealing ring 412 having a sealing ring gap 416 and a cover ring 414 having a cover ring gap 418. In this embodiment, in order to prevent rotation of the rings 412, 414 relative to each other, the seal assembly 410 includes means for preventing rotation of the sealing ring 412 relative to the cover ring 414, so that the position of the sealing ring gap 416 remains opposite the position of the cover ring gap 418. In this embodiment, such means comprises providing the cover ring 414 with an annular recess 419 that does not extend around the full circumference thereof, so that a raised portion 480 is created on the cover ring 414. When the sealing ring 412 is assembled with the cover ring 414, the sealing ring gap 416 is placed so that flanks the raised portion 480 in the cover ring 414, thereby preventing rotation of the sealing ring 412 relative to the cover ring 414. Other example of means for preventing rotation of the sealing ring 412 relative to the cover ring 414 include the use of a pin and slot arrangement, a pin inserted through both parts, or other means to prevent relative rotation of the two rings.

Although exemplary implementations of the herein described systems and/or methods have been described in detail above, those skilled in the art will readily appreciate that many additional modifications are possible in the exemplary embodiments without materially departing from the novel teachings and advantages of the herein described systems and methods. Accordingly, these and all such modifications are intended to be included within the scope of the herein described systems and/or methods. The herein described systems and/or methods may be better defined by the following exemplary claims.

What is claimed is:

1. A seal assembly comprising:
    a sealing ring having a sealing ring gap formed therein, an inner sealing ring wall, an outer sealing ring wall, wherein the outer sealing ring wall opposes the inner sealing ring wall, a top sealing ring wall and a bottom sealing ring wall wherein the bottom sealing ring wall opposes the top sealing ring wall, the top sealing ring wall having a radial sealing ring width, wherein one of the inner sealing ring wall and the outer sealing ring wall is a sealing wall; and
    a cover ring having a cover ring gap formed therein, an inner cover ring wall, an outer cover ring wall, wherein the outer cover ring wall opposes the inner cover ring wall, a top cover ring wall, and a bottom cover ring wall wherein the bottom cover ring wall opposes the top cover ring wall, an annular recess having a floor that opposes the bottom cover ring wall and a recess wall that opposes one of the inner cover ring wall and the outer cover ring wall, the floor having a radial recess width and a sealing edge that is distal to the recess wall;
    wherein the sealing ring and the cover ring have an assembled position in which the sealing ring is seated in the annular recess of the cover ring, the sealing ring gap does not overlap the cover ring gap, wherein the sealing ring and the cover ring form a first region and a second region when in the assembled position, wherein the first region overlaps the sealing ring gap and not the cover ring gap and the second region overlaps the cover ring gap and not the sealing ring gap, wherein the radial recess width is equal to the radial sealing ring width in the first region, and wherein the radial recess width is less than the radial sealing ring width in the second region.

2. The seal assembly of claim 1, wherein the first region extends a radial angle of at least 15 degrees in a clockwise and counterclockwise direction from a midpoint of the sealing ring gap.

3. The seal assembly of claim 1, wherein the sealing wall protrudes beyond the sealing edge of the floor of the annular recess in the second region.

4. The seal assembly of claim 1, wherein an arcuate length of a portion of the cover ring located within first region is at least 5 times a radial width of the seal assembly.

5. The seal assembly of claim 1, wherein an arcuate length of a portion of the cover ring located within first region is between 8 and 10 times a radial width of the seal assembly.

6. The seal assembly of claim 1, wherein the radial sealing ring width is constant throughout the first region and the second region.

7. The seal assembly of claim 1, wherein the annular recess has a rectangular cross section.

8. The seal assembly of claim 1, wherein the sealing ring has a rectangular cross section.

9. The seal assembly of claim 1, further comprising means for preventing rotation of the sealing ring relative to the cover ring when the sealing ring and the cover ring are in the assembled position.

10. An apparatus comprising:
    a cylinder; and
    a piston that is located within the cylinder and is operatively configured to reciprocate within the cylinder, the piston having at least one seal assembly, each of the at least one seal assembly being seated in an annular groove and comprising the seal assembly recited in claim 1.

11. The apparatus of claim 10, wherein an arcuate length of a portion of the cover ring located within first region is at least 5 times a radial width of the seal assembly.

12. The apparatus of claim 10, wherein an arcuate length of a portion of the cover ring located within first region is between 8 and 10 times a radial width of the seal assembly.

13. The apparatus of claim 10, wherein the radial sealing ring width is constant throughout the first region and the second region.

14. An apparatus comprising:
a cylinder having at least one seal assembly, each of the at least one seal assembly being seated in an annular groove and comprising the seal assembly recited in claim 1; and
a shaft that is located within the cylinder and is operatively configured to reciprocate within the cylinder.

15. The apparatus of claim 14, wherein an arcuate length of a portion of the cover ring located within first region is at least 5 times a radial width of the seal assembly.

16. The apparatus of claim 14, wherein an arcuate length of a portion of the cover ring located within first region is between 8 and 10 times a radial width of the seal assembly.

17. The apparatus of claim 14, wherein the radial sealing ring width is constant throughout the first region and the second region.

* * * * *